June 15, 1954  H. E. CHURCHILL  2,680,954
TORQUE CONVERTER COOLING SYSTEM
Filed March 1, 1952  2 Sheets-Sheet 1

INVENTOR.
Harold E. Churchill
BY Brown, Jackson, Boettcher & Dienner
ATTORNEYS

June 15, 1954  H. E. CHURCHILL  2,680,954
TORQUE CONVERTER COOLING SYSTEM
Filed March 1, 1952  2 Sheets-Sheet 2

INVENTOR.
Harold E. Churchill
BY Brown, Jackson, Boettcher & Dienner
ATTORNEYS.

Patented June 15, 1954

2,680,954

UNITED STATES PATENT OFFICE 2,680,954

TORQUE CONVERTER COOLING SYSTEM

Harold E. Churchill, South Bend, Ind., assignor to The Studebaker Corporation, South Bend, Ind., a corporation of Delaware Application March 1, 1952, Serial No. 274,469

15 Claims. (Cl. 60—54)

The present invention relates to a cooling system for torque converters, automatic power transmissions and the like, and comprises, generally, a system for cooling the actuating fluid of converters and transmissions.

Various torque converters and automatic power transmissions are known wherein actuation, power transmission, or torque conversion is accomplished by means of a fluid, usually a hydraulic fluid. In use and operation of such converters and transmissions, the fluid is usually heated to a high degree. If the fluid is overheated, chemical breakdown and viscosity change of the fluid occur and the operation of the converter or transmission is thus drastically impaired. Frequently, the devices are rendered entirely inoperative by overheating of the hydraulic fluid. In addition, overheating frequently results in damage to the structural components of the apparatus.

An object of the present invention is to prevent overheating of fluids in torque converters and automatic transmissions by providing an improved cooling system therefor.

In the past, cooling systems for the hydraulic fluid of torque converters and automatic transmissions have been proposed wherein a heat exchanger or the like is disposed remotely of the converter or transmission and cooling is effected as a result of reduced ambient temperature and/or normal air flow over the heat exchanger. Cooling systems of this general character suffer several disadvantages, among which are the disposition of the heat exchanger remotely of the converter or transmission so that long conduit leads are required and the requirement for relatively large heat exchangers due to the slow rate of flow of cooling medium over the heat exchangers.

It is an object of the present invention to overcome the disadvantages of prior cooling systems for torque converter and transmission fluids by providing an improved cooling system therefor, comprising a heat exchanger disposed adjacent the converter or transmission and means for forcing a rapid flow of cooling medium over the heat exchanger to cool the hydraulic fluid and maintain same at an optimum operating temperature.

Another object of the present invention is to provide a heat exchanger for torque converter and transmission fluids and at least one fan for inducing a constant and rapid flow of cooling medium, preferably air, over the heat exchanger, the heat exchanger being disposed immediately adjacent the converter or transmission, so that same may be readily included within the fluid circuit of the converter or transmission.

A further object of the invention is the provision of an improved cooling system for torque converter and transmission fluids including a heat exchanger, an intake fan for forcing the cooling medium, preferably air, to the heat exchanger, and an exhaust fan for drawing the cooling medium away from the heat exchanger, whereby a rapid forced flow of cooling medium over the heat exchanger is accomplished.

As is known, torque converters and transmissions of the character referred to are utilized in automotive vehicles and are usually disposed between the engine flywheel and the vehicle drive shaft for transmitting power from the engine crankshaft to the drive shaft. According to the present invention, the engine flywheel and torque converter housing is utilized as the housing for the cooling system of the present invention so that the heat exchanger of the cooling system may be disposed immediately adjacent the converter or transmission. The intake and exhaust fans of the cooling system of the present invention are adapted for association with the engine flywheel and/or other rotary parts of the power drive train of the vehicle for actuation thereby. Intake and exhaust ports are conveniently provided in the flywheel and converter housing for accommodating air flow in the manner stated hereinbefore.

In trucks and military vehicles, a requirement is usually made that the vehicle be capable of traversing bodies of water of various depths. An object of the present invention is to provide a cooling system of the character described having air intake and exhaust ports so disposed that bodies of water may be successfully traversed by vehicles with which the system is associated without entry of water to the flywheel housing and associated apparatus.

Specifically, it is an object of the present invention to provide an improved cooling system for hydraulic torque converters and transmissions wherein the torque converter, or transmission is enclosed within a housing, the cooling system comprising means dividing the housing into an intake chamber and an exhaust chamber, a heat exchanger connected in the fluid circuit of the converter or transmission and disposed at the bottom of the housing in communication with both chambers, intake and exhaust ports communicating with the respective chambers and preferably disposed in the top wall of the housing so that same are located at a relatively high level, and intake and exhaust fans disposed within the respective chambers, the fans preferably being annular members mounted coaxially of the drive shaft of the power transmission train and fixed, respectively, to the flywheel or input side of the converter or transmission and to the output side of the converter or transmission.

Other objects and advantages of the present invention will become apparent from the following detailed description of a preferred embodiment of the invention, wherein reference is made to the acompanying drawings, in which.

Figure 1:
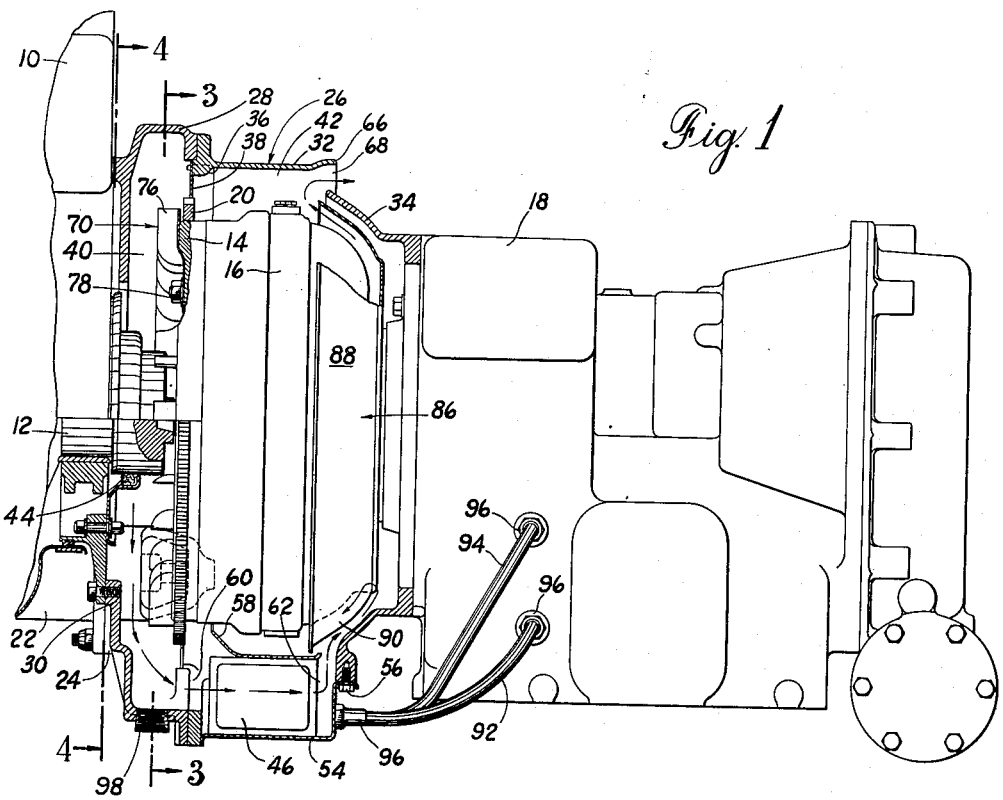
Figure 1 is a side view, partly in section and partly in elevation, of an engine flywheel, torque converter, housing therefor and power transmission, showing the system of the present invention associated therewith.
Figure 2:
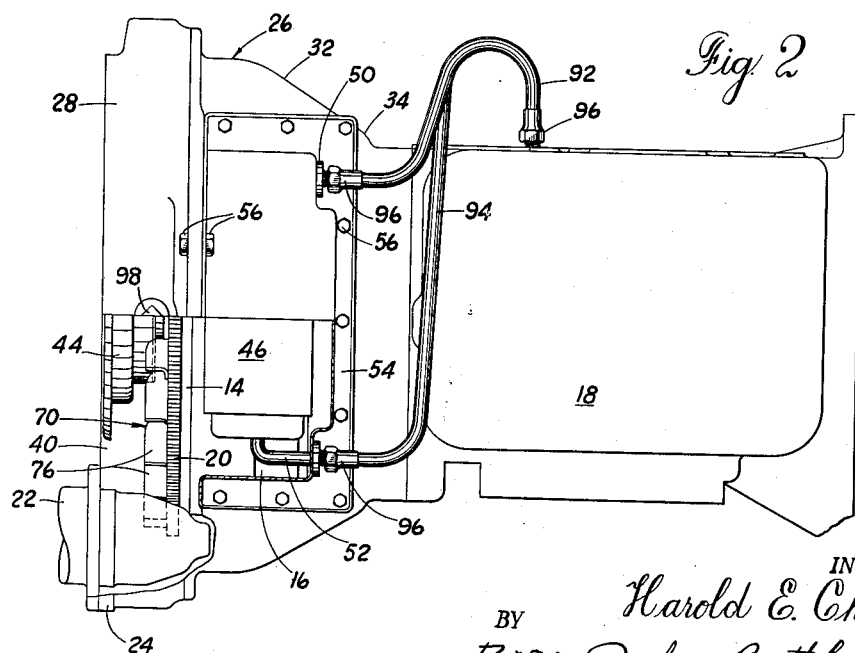
Figure 2 is a bottom view, partly in section and partly in elevation, of the apparatus shown in Figure 1.
Figure 3:
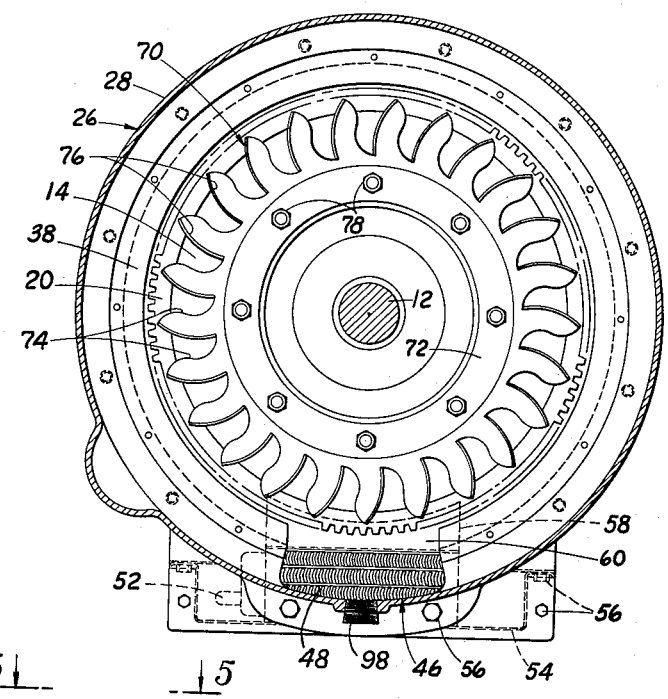
Figure 3 is a vertical section taken substantially on the line 3—3 of Figure 1.
Figure 4:
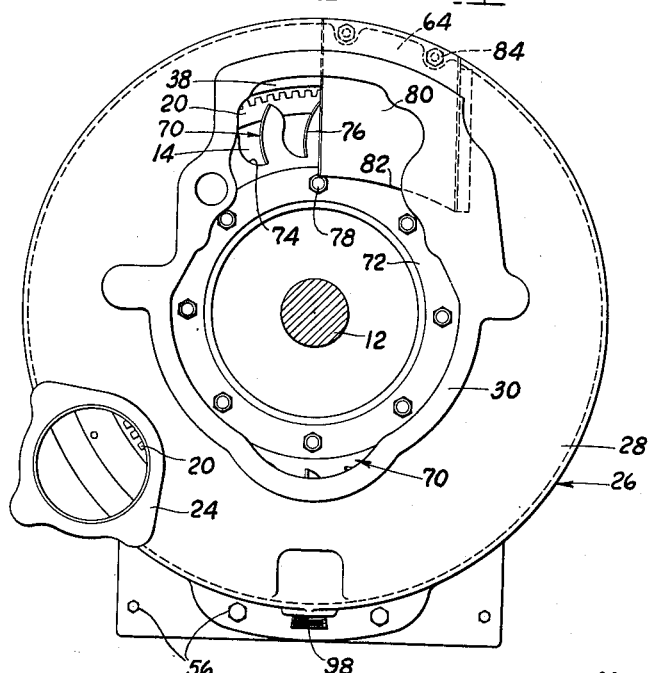
Figure 4 is a front end elevation of the flywheel housing, taken substantially on the line 4—4 of Figure 1, with portions of the housing being broken away to show the air inlet or intake port.
Figure 5:
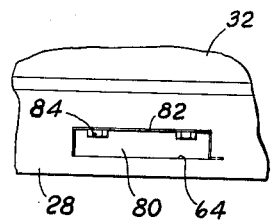
Figure 5 is a partial top plan view of the portion of the flywheel housing containing the intake port, the view being taken substantially on line 5—5 of Figure 4.

Referring now to the drawings, the present invention is shown as included within the drive train of a suitable internal combustion engine. A portion of the engine block is indicated at 10 and the engine is provided with a crankshaft 12 drivingly connected to a flywheel 14, which is suitably associated with a torque converter 16 and a transmission 18.

The torque converter 16 is preferably one utilizing a hydraulic fluid as its transmission medium and the transmission 18 is preferably of the automatic hydraulic type. As is conventional, the automatic hydraulic transmission 18 is preferably provided with a pump or the like, not shown, adapted to circulate fluid through a system or circuit defined within the transmission and torque converter.

The flywheel 14 carries on the outer periphery thereof a conventional circular starting gear 20 adapted for cooperation with a pinion adapted to be driven by a conventional starter motor 22. The starter motor 22 is suitably supported on a flanged portion 24 of a housing 26 encasing the flywheel 14 and the converter 16. The housing 26 includes a forward shallow cup-shaped housing member 28 provided with the flanged portion 24 and with a second flanged portion 30 adapted for securement to the engine block 10. The housing 26 also includes a central cylindrical portion or member 32 and a rearward cup-shaped member 34. The housing members 28, 32 and 34 may be suitably secured together in any desired manner, and are suitably spaced radially from the outer surface of the torque converter and flywheel so as to provide an annular chamber about the flywheel and converter.

The central cylindrical portion 32 of the flywheel and converter housing 26 is provided with an inwardly projecting flange 36 disposed adjacent the cup-shaped forward member 28 of the housing and defining a mounting surface for a generally annular disc 38. The disc 38 extends radially inward from the flange 36 to a point adjacent the starter gear 20 and forms therewith a partition in the housing 26 defining a pair of chambers to opposite sides thereof, namely, an intake chamber 40 to the forward side of the housing and an exhaust chamber 42 to the rearward side of the housing. The forward side of the housing member 28 and the forward side of the intake chamber 40 are suitably sealed by means of an annular seal 44 engaging about the periphery of the engine crankshaft 12. The cylindrical central portion 32 of the housing 26 is cut away at its bottom portion, or is provided with an opening at the bottom thereof, adapted for the reception of a heat exchanger 46, of conventional structure, including a plurality of finned coils or passages 48 and a pair of conduit leads 50 and 52 leading to the coils 48. The leads 50 and 52 may suitably comprise pipe connections and either one may constitute the inlet or outlet to the heat exchanger coils. The heat exchanger 46 is carried by a mounting bracket 54 adapted to be detachably secured to the body portions 32 and 34 of the housing 26 by means of suitable fasteners, such as bolts 56. At the upper side thereof, the heat exchanger 46 carries a suitable bracket or baffle member 58.

At the lower portion thereof, the inwardly projecting flange 36 of the cylindrical portion 32 of the housing 26 and the partition 38 are broken or cut away so that each actually is generally C-shaped, with the open end thereof disposed downwardly. The open bottom portion of the flange 36 and the partition 38 are adapted for the reception of the heat exchanger 46 and the brackets 54 and 58 therefor. The baffle member 58, with the flange 36 and the partition 38, defines an inlet 60 from the intake chamber 40 to the exterior surfaces of the finned coils 48 of the heat exchanger 46. The brackets 54 and 58 are open at the rearward side thereof to provide an outlet 62 communicating with the exhaust chamber 42.

The forward cup-shaped portion 28 of the housing 26 is provided with a small opening 64 at the top thereof comprising an intake port communicating with the intake chamber 40. The housing member 32 is provided at the rearward portion thereof with a lip 66 extending rearwardly in spaced relation with respect to the housing portion 34 to form therewith an opening 68 comprising an exhaust port communicating with the exhaust chamber 42. Accordingly, it will be appreciated that the various openings and partition means define a path of fluid flow through the flywheel and converter housing extending through the intake port 64, the intake chamber 40, the heat exchanger 46, the exhaust chamber 42, and the exhaust port 68.

To induce a flow of cooling medium from the intake port 64 to the inlet 60 of the heat exchanger 46, a centrifugal fan 70 is disposed within the intake chamber 40. The fan 70 preferably comprises an annular disc 72 of sheet metal stamped at spaced points to form arcuate cuts or slots 74 therein extending substantially radially of the disc and partially therethrough so that same define a margin from which the material of the disc may be turned outwardly to form a plurality of fan blades 76. The centrifugal fan 70 is preferably secured to a rotating part of the engine drive train coaxially therewith so as to draw air through the intake port 64 and force same to the intake 60 of the heat exchanger 46. To this end, the centrifugal fan 70 is preferably secured to the forward surface of the flywheel 14, coaxially therewith, by means of a plurality of suitable fasteners, such as bolts 78. To provide an appropriate and proper inlet to the eye or central portion of the centrifugal fan 70, the intake port 64 preferably includes a vertically depending duct 80 extending inwardly from the top wall of the housing to a point adjacent the axis of the flywheel 14. Preferably, the duct 80 is defined by the front wall of the housing member 28 and by means of a sheet metal channel 82 suitably secured to the rear flange of the housing member 28, by means of a plurality of bolts 84.

To induce the flow of cooling medium over the coils of the heat exchanger 46, and to force the exhausted cooling medium through the exhaust chamber 42 and the exhaust port 68, a suitable fan member 86 is positioned within the exhaust chamber 42 and operatively associated with the output side of the converter 16 for actuation thereby. Preferably, the fan 86 comprises a generally cup-shaped member 88 encompassing the rearward portions of the torque converter 16 and provided with a plurality of inwardly extending buckets 90, or the like, forming fan blades adapted to induce the flow of air through the heat exchanger 46 and through the exhaust port 68. The fan member 86 is a conventional part of commercial torque converters and, as such, its inclusion within the cooling system of the present invention to effect a more thorough flow of cooling medium is an advantage obtained without cost.

As will be apparent from the drawings, the intake port 64 and the exhaust port 68 are disposed at the top of the housing 26 for the flywheel 14 and the converter 16, and the heat exchanger 46 is disposed at the bottom of the housing to effect a highly efficient flow of cooling medium over the coils 48 of the heat exchanger 46, and at the same time to dispose the ports 64 and 68 at an elevated position so that when the flywheel and torque converter are associated with a vehicle or the like, the ports are disposed at a considerable distance above the ground engaging portion of the vehicle, whereby the vehicle is adapted for traversing relatively deep bodies of water without danger of water entering into the flywheel and converter housing. In addition, the housing 26 encloses the heat exchanger 46 to prevent damage thereto. The fans 70 and 86 may be suitably associated with any portion of the engine drive train for actuation thereby. However, as pointed out hereinbefore, the intake fan 70 is preferably secured to the forward face of the flywheel 14 for actuation thereby and the exhaust fan 86 is preferably associated with the output shaft of the torque converter 16. Accordingly, whenever the engine 10 is operated, the intake fan 70 will induce circulation of cooling medium throughout the cooling medium circuit or path so that the hydraulic fluid of the converter and transmission is effectively and efficiently cooled. When the vehicle is in motion, both the fan 70 and the fan 86 are actuated to effect an efficient flow of cooling medium through the cooling system. The fan 86 normally operates at the same speed as the fan 70 so that the fan 86 is continually primed to effectively discharge exhaust cooling medium from the cooling system.

To provide for flow of the hydraulic fluid of the converter 16 and the transmission 18 through the coils 48 of the heat exchanger 46, the transmission 18 preferably includes, as pointed out hereinbefore, a pump for forcing hydraulic fluid through the fluid circuit of the converter 16 and the transmission 18. Accordingly, suitable conduits or leads 92 and 94 may be associated with the pump in the transmission or suitably disposed within the fluid circuit of the converter and transmission so that hydraulic fluid is forced through the conduits 92 and 94 to and through the heat exchanger 46. If desired, the outlet from the heat exchanger 46 may lead directly to the fluid sump of the transmission. The conduits or leads 92 and 94 may be either flexible or rigid, as desired for any particular installation, and are preferably associated with the transmission and heat exchanger at the opposite ends thereof by suitable pipe connectors 96 or the like.

If desired, the housing 26 may be suitably provided with a clean-out and inspection plug 98 at the bottom thereof. Preferably, a tapped bore is provided at the bottom side of the forward portion 28 of the housing 26 and the drain plug 98 is suitably threaded therein.

As pointed out hereinbefore, it is preferred that the intake and exhaust ports be disposed at the top of the housing and communicate with atmosphere so that air comprises the cooling medium. It will be appreciated, however, that the ports may be provided with duct extensions leading to a higher location and that the ports, or at least the intake port, may be associated with a source of cooling medium other than atmospheric air.

From the foregoing, it will be appreciated that the present invention provides an improved cooling system for hydraulic torque converters, transmissions and the like. The cooling system is compact and closely associated with the torque converter or transmission so that same requires little or no room in addition to that normally provided and consists mainly in the provision of suitable ports in the housing, partition means dividing the housing into two chambers, a heat exchanger, and at least one fan for inducing flow of the cooling medium through the heat exchanger. The ports may be disposed at any desirable location in the flywheel and torque converter housing, but are preferably disposed at the top thereof for the purposes pointed out hereinbefore. It will also be appreciated that the present invention provides a cooling system for the hydraulic fluids of torque converters, transmissions and the like of extremely economical design, manufacture and assembly adapted for efficient and effective service throughout substantially the full life of the apparatus with which associated. By providing means for cooling the hydraulic fluids of torque converters and transmissions, the present invention insures efficient operation of the converter or transmission, first by preventing chemical breakdown or viscosity change in the hydraulic fluid and second by effectively and efficiently cooling the structural components of the torque converter or transmission so that same are not subject to undue wear and the like.

While I have described what I regard to be a preferred embodiment of my invention, it will be apparent that various changes, rearrangements and modifications may be made therein without departing from the scope of the invention, as defined by the appended claims.

I claim:

1. In a hydraulic torque converter including a housing, means dividing the housing into a pair of chambers, a heat exchanger mounted in the housing in communication with both of said chambers, a pair of spaced ports in the housing opening adjacent the periphery thereof, said ports being disposed to opposite sides of said means and each communicating with one of said chambers and a source of cooling medium, and a fan in at least one of said chambers for effecting circulation of cooling medium through said ports, said chambers and said heat exchanger, said heat exchanger being disposed in the fluid circuit of the converter whereby the hydraulic fluid of the converter is cooled.

2. In a hydraulic torque converter including a housing, a partition in the housing dividing the housing into a pair of chambers, said partition being open at one portion thereof adjacent the periphery of the housing, a heat exchanger disposed in the open portion of said partition and communicating with both of said chambers, a pair of longitudinally spaced ports in the housing opening adjacent the periphery thereof and to the side thereof opposite said heat exchanger, said ports being disposed to opposite sides of said partition and each communicating with one of said chambers and a source of cooling medium, and a fan in at least one of said chambers for effecting circulation of cooling medium through said ports, said chambers and said heat exchanger, said heat exchanger being disposed in the fluid circuit of the converter whereby the hydraulic fluid of the converter is cooled.

3. In a hydraulic torque converter including a housing, means dividing the housing into an intake chamber and an exhaust chamber, an intake port in the housing opening adjacent the periphery thereof and communicating with said intake chamber and a source of cooling medium, an exhaust port in the housing opening adjacent the periphery thereof and communicating with said exhaust chamber, a heat exchanger in the housing communicating with both of said chambers, said ports being disposed at one side of the housing and said heat exchanger being disposed at the opposite side thereof, and a fan in at least one of said chambers operatively associated with the converter for effecting flow of cooling medium through said intake port, said intake chamber, said heat exchanger, said exhaust chamber and said exhaust port, said heat exchanger being disposed in the fluid circuit of the converter.

4. In a hydraulic torque converter including a housing, means dividing the housing into an intake chamber and an exhaust chamber, an intake port in the housing communicating with said intake chamber and a source of cooling medium, an exhaust port in the housing communicating with said exhaust chamber, a heat exchanger in the housing communicating with both of said chambers, and a fan in each of said chambers operatively associated with the converter for effecting flow of cooling medium through said intake port, said intake chamber, said heat exchanger, said exhaust chamber and said exhaust port, said heat exchanger being disposed in the fluid circuit of the converter.

5. In a hydraulic torque converter including a housing, a partition in the housing dividing the housing into an intake chamber and an exhaust chamber, an intake port in the housing communicating with said intake chamber and a source of cooling medium, an exhaust port in the housing communicating with said exhaust chamber, said partition being open at one portion thereof, a heat exchanger in said open portion of said partition and communicating with both of said chambers, a fan in said intake chamber operatively associated with the converter for effecting flow of cooling medium through said intake port and said intake chamber to said heat exchanger, and a fan in said exhaust chamber operatively associated with the converter for discharging cooling medium from said heat exchanger through said exhaust chamber and said exhaust port, said heat exchanger being disposed in the fluid circuit of the converter.

6. In a power drive train, a flywheel, a hydraulic torque converter, a housing for said flywheel and said torque converter, said flywheel being disposed to the input side of said converter, a partition in said housing intermediate the ends thereof dividing said housing into a pair of chambers, said partition being open at one portion thereof adjacent the periphery of said housing, a heat exchanger disposed in the open portion of said partition and communicating with both of said chambers, said heat exchanger being connected in the fluid circuit of said converter, said housing having a first port therein establishing communication between one of said chambers and a source of cooling medium and a second port therein communicating with the other of said chambers, said ports opening adjacent the periphery of said housing to one side thereof and said heat exchanger being disposed in spaced relation to said ports, and a fan disposed to the output side of said converter and operatively associated with said converter for actuation thereby, said fan when actuated effecting flow of cooling medium through said ports, said chambers and said heat exchanger.

7. In a power drive train, a flywheel, a hydraulic torque converter, a housing for said flywheel and said torque converter, said flywheel being disposed to the input side of said converter, a partition in said housing intermediate the ends thereof dividing said housing into a pair of chambers within one of which said flywheel is disposed, said partition being open at one portion thereof, a heat exchanger disposed in the open portion of said partition and communicating with both of said chambers, said heat exchanger being connected in the fluid circuit of said converter, said housing having a first port therein establishing communication between one of said chambers and a source of cooling medium and a second port therein communicating with the other of said chambers, and a fan disposed to the input side of said converter and operatively associated with said flywheel for actuation thereby, said fan when actuated effecting flow of cooling medium through said ports, said chambers and said heat exchanger.

8. In a power drive train, a flywheel, a hydraulic torque converter, a housing for said flywheel and said torque converter, said flywheel being disposed to the input side of said converter, a partition in said housing intermediate the ends thereof dividing said housing into an intake chamber within which said flywheel is disposed and an exhaust chamber, said partition being open at one portion thereof, a heat exchanger disposed in the open portion of said partition and communicating with both of said chambers, said heat exchanger being connnected in the fluid circuit of said converter, said housing having an intake port therein establishing communication between said intake chamber and a source of cooling medium and an exhaust port therein communicating with said exhaust chamber, a centrifugal fan disposed to the input side of said converter and operatively associated with said flywheel for actuation thereby, said fan being annular and secured to said flywheel coaxially thereof, and an intake duct disposed in said intake chamber between said intake port and the eye of said fan, said fan when actuated drawing cooling medium through said intake port and said intake duct and forcing cooling medium through said intake chamber, said heat exchanger, said exhaust chamber and said exhaust port.

9. In a vehicle power drive train, a flywheel, a hydraulic torque converter, a housing for said flywheel and said torque converter, said flywheel and said converter being disposed with their axes substantially horizontal, said flywheel being disposed to the input side of said converter, a substantially vertical partition in said housing intermediate the ends thereof dividing said housing into an intake chamber within which said flywheel is disposed and an exhaust chamber, said partition being open at the bottom portion thereof, a heat exchanger disposed in the open portion of said partition at the bottom of said housing and communicating with both of said chambers, said heat exchanger being connected in the fluid circuit of said converter, said housing having an intake port therein at the top thereof establishing communication between said intake chamber and a source of cooling medium and an exhaust port therein at the top thereof communicating with said exhaust chamber, a centrifugal fan disposed to the input side of said converter and operatively associated with said flywheel for actuation thereby, said fan being annular and secured to said flywheel coaxially thereof, and an intake duct disposed in said intake chamber and depending substantially vertically from said intake port to the eye of said fan, said fan when actuated drawing cooling medium through said intake port and said intake duct and forcing cooling medium through said intake chamber, said heat exchanger, said exhaust chamber and said exhaust port.

10. In a substantially horizontally disposed vehicle power drive train having a hydraulic torque converter, a flywheel disposed to the input side of the converter, and a power transmission including means for forcing hydraulic fluid through the converter and the transmission disposed to the output side of the converter; a housing for the flywheel and torque converter, a substantially vertically disposed partition in said housing intermediate the ends thereof dividing said housing into an intake chamber within which the flywheel is disposed and an exhaust chamber, said partition being open at the bottom portion thereof, a heat exchanger disposed in the open portion of said partition at the bottom of said housing and communicating with both of said chambers, said heat exchanger being connected in the fluid circuit of the converter, said housing having an intake port therein at the top thereof establishing communication between said intake chamber and a source of cooling medium and an exhaust port therein at the top thereof communicating with said exhaust chamber, a centrifugal fan disposed to the input side of the converter in said intake chamber and operatively associated with the flywheel for actuation thereby, said fan being annular and secured to the flywheel coaxially thereof, and an intake duct disposed in said intake chamber and depending substantially vertically from said intake port to the eye of said fan, said fan when actuated drawing cooling medium through said intake port and said intake duct and forcing cooling medium through said intake chamber, said heat exchanger, said exhaust chamber and said exhaust port.

11. In a substantially horizontally disposed vehicle power drive train having a hydraulic torque converter, a flywheel disposed to the input side of the converter, and a power transmission including means for forcing hydraulic fluid through the converter and transmission disposed to the output side of the converter; a housing for the flywheel and torque converter, a substantially vertically disposed partition in said housing intermediate the ends thereof dividing said housing into an intake chamber within which the flywheel is disposed and an exhaust chamber, said partition being open at the bottom portion thereof, a heat exchanger disposed in the open portion of said partition at the bottom of said housing and communicating with both of said chambers, said heat exchanger being connected in the fluid circuit of the converter, said housing having an intake port therein at the top thereof establishing communication between said intake chamber and a source of cooling medium and an exhaust port therein at the top thereof communicating with said exhaust chamber, a centrifugal fan disposed to the input side of the conerter in said intake chamber and operatively associated with the flywheel for actuation thereby, said fan being annular and secured to the flywheel coaxially thereof, an intake duct disposed in said intake chamber and depending substantially vertically from said intake port to the eye of said fan, said fan when actuated drawing cooling medium through said intake port and said intake duct and forcing cooling medium through said intake chamber to said heat exchanger, and a fan in said exhaust chamber to the output side of the converter and operatively associated with the output side of the converter for actuation thereby, said fan in said exhaust chamber drawing cooling medium from said heat exchanger and discharging the same through said exhaust chamber and said exhaust port.

12. In a vehicle power drive train, a substantially horizontally disposed torque converter, a housing for said converter, substantially vertically disposed wall means dividing said housing into a pair of chambers, a heat exchanger mounted within said housing at the bottom thereof and communicating with both of said chambers, a pair of ports in said housing at the top thereof each communicating with one of said chambers and a source of cooling medium, and a fan in at least one of said chambers for effecting circulation of cooling medium through said ports, said chambers and said heat exchanger, said heat exchanger being disposed in the fluid circuit of said converter.

13. In a vehicle power drive train, a substantially horizontally disposed torque converter, a housing for said converter, substantially vertically disposed wall means dividing said housing into a pair of chambers, a heat exchanger mounted within said housing at the bottom thereof and communicating with both of said chambers, a pair of ports in said housing at the top thereof each communicating with one of said chambers, at least one of said ports communicating with a source of cooling medium, and a fan in a pair of ports in said housing at the top thereof each communicating with one of said chambers, at least one of said ports communicating with a source of cooling medium, and a fan in each of said chambers for effecting circulation of cooling medium through said ports, said chambers and said heat exchanger, said heat exchanger being disposed in the fluid circuit of said converter whereby the hydraulic fluid of said converter is cooled.

14. In a vehicle power drive train, a substantially horizontally disposed torque converter, a housing for said converter, substantially vertically disposed wall means dividing said housing into an intake chamber and an exhaust chamber, a heat exchanger mounted within said housing at the bottom thereof and communicating with both of said chambers, an intake port in said housing at the top thereof communicating with said intake chamber and a source of cooling medium, an exhaust port in said housing at the top thereof communicating with said exhaust chamber, and a fan in at least one of said chambers for effecting circulation of cooling medium through said ports, said chambers and said heat exchanger, said heat exchanger being disposed in the fluid circuit of said converter whereby the hydraulic fluid of said converter is cooled.

15. In a vehicle power drive train, a substantially horizontally disposed torque converter, a housing for said converter, a substantially vertically disposed partition in said housing dividing said housing into an intake chamber and an exhaust chamber, said partition being open at the bottom thereof, a heat exchanger mounted within said housing at the bottom thereof in the open portion of said partition and communicating with both of said chambers, said heat exchanger being disposed within the fluid circuit of said converter, an intake port in said housing at the top thereof communicating with said intake chamber and a source of cooling medium, an exhaust port in said housing at the top thereof communicating with said exhaust chamber, an intake fan in said intake chamber for supplying cooling medium to said heat exchanger, and an exhaust fan in said exhaust chamber for discharging cooling medium from said heat exchanger.

References Cited in the file of this patent

UNITED STATES PATENTS

| Number | Name | Date |
|---|---|---|
| 2,149,117 | Dodge | Feb. 28, 1939 |
| 2,363,983 | Miller | Nov. 28, 1944 |
| 2,409,374 | McGill | Oct. 15, 1946 |
| 2,611,248 | Åhlén et al. | Sept. 23, 1952 |